United States Patent
Yu et al.

(10) Patent No.: US 9,424,186 B2
(45) Date of Patent: Aug. 23, 2016

(54) METHOD AND APPARATUS FOR CONTROLLING MEMORY STARTUP

(71) Applicant: Huawei Technologies Co., Ltd., Shenzhen, Guangdong (CN)

(72) Inventors: Bingxu Yu, Shenzhen (CN); Zhiyong Cai, Shenzhen (CN); Zhi Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 14/475,118

(22) Filed: Sep. 2, 2014

(65) Prior Publication Data

US 2015/0067280 A1    Mar. 5, 2015

(30) Foreign Application Priority Data

Sep. 2, 2013    (CN) .......................... 2013 1 0392586

(51) Int. Cl.
*G06F 12/06*    (2006.01)
*G06F 13/16*    (2006.01)
*G06F 9/44*    (2006.01)
*G06F 9/445*    (2006.01)
*G06F 11/14*    (2006.01)

(52) U.S. Cl.
CPC .......... *G06F 12/0646* (2013.01); *G06F 9/4403* (2013.01); *G06F 9/44505* (2013.01); *G06F 9/44573* (2013.01); *G06F 11/1417* (2013.01); *G06F 13/1668* (2013.01)

(58) Field of Classification Search
None
See application file for complete search history.

(56) References Cited

U.S. PATENT DOCUMENTS 6,426,893 B1 * 7/2002 Conley ................ G06F 12/0246
                                                        365/185.09
7,061,804 B2    6/2006 Chun et al.
(Continued)

FOREIGN PATENT DOCUMENTS

CN    101438253 A    5/2009
CN    100578660 C    1/2010
(Continued)

OTHER PUBLICATIONS

"Xilinx Generic Flash Memory Interface Solutions," WP 143 (v1.0): Spartan-II, pp. 1-12, Xilinx, Inc., San Jose, California (May 8, 2001).
(Continued)

*Primary Examiner* — Gary Portka
(74) *Attorney, Agent, or Firm* — Leydig, Voit & Mayer, Ltd.

(57) ABSTRACT

Embodiments of the present invention disclose a method and an apparatus for controlling memory startup, and relate to the field of memory control technologies. The present invention is not limited to the number of pins of a control chip, thereby reducing costs. The method is applied to a control apparatus, where the control apparatus includes a preset data segment; the preset data segment includes at least one sub data segment; and each sub data segment is corresponding to one configuration type. The method includes: reading each sub data segment in a first data segment and performing a first operation on a sub data segment corresponding to a first configuration type to obtain a second data segment; performing matching between the second data segment and the preset data segment; and starting up the memory according to the first configuration type when the second data segment matches the preset data segment.

10 Claims, 6 Drawing Sheets

(56) References Cited

U.S. PATENT DOCUMENTS

| | | |
|---|---|---|
| 2006/0104115 A1 | 5/2006 | Chun et al. |
| 2007/0192657 A1 | 8/2007 | Laurent et al. |
| 2010/0251074 A1 | 9/2010 | Chu et al. |
| 2013/0132652 A1* | 5/2013 | Wood .................. G06F 12/0246 711/103 |

FOREIGN PATENT DOCUMENTS

| | | |
|---|---|---|
| CN | 101848000 A | 9/2010 |
| CN | 102184117 A | 9/2011 |

OTHER PUBLICATIONS

Chen et al., "An Adaptive-Rate Error Correction Scheme for NAND Flash Memory," 2009 $27^{th}$ IEEE VLSI Test Symposium, pp. 53-58, Institute of Electrical and Electronics Engineers, New York, New York (May 3-7, 2009).

Ogdan et al., "Booting from the DiskOnChip Millennium," Application Note Ap-DOC-044, 93-SR-001-44-7L Rev. 1.0, pp. 1-23, M-Systems Ltd., Tel Aviv, Israel (May 2000).

* cited by examiner

US 9,424,186 B2
METHOD AND APPARATUS FOR CONTROLLING MEMORY STARTUP

CROSS-REFERENCE TO RELATED APPLICATION

This application claims priority to Chinese Patent Application No. 201310392586.6, filed Sep. 2, 2013, which is hereby incorporated by reference in its entirety.

TECHNICAL FIELD

The present invention relates to the field of memory control technologies, and in particular, to a method and an apparatus for controlling memory startup.

BACKGROUND

A NAND Flash is a non-volatile random access memory suitable for storing large volume data. Different NAND Flashes have different configuration types (also known as "specifications"), which is specifically embodied in a difference of the following one or more parameters: a maximum error checking and correction (ECC) capability, a pagesize, a blocksize, and the like.

The NAND Flash can implement various functions only under control of a control chip, such as a startup function, a data writing function, and a data reading function. A control over the NAND Flash by the control chip needs to comply with a configuration type of the NAND Flash to implement matching configuration. For example, it is required to meet the maximum ECC capability of the NAND Flash and read data according to the pagesize required by the NAND Flash. At present, generally before the NAND Flash is controlled to start up, pin information of the control chip is configured manually, so that the control chip learns the configuration type of the NAND Flash, and further controls, according to the configuration type of the NAND Flash, the NAND Flash to start up and implement various functions.

In the foregoing implementation process of controlling memory startup, the inventor finds that at least the following problem exists in the prior art: In a solution in which pin information of a control chip is manually configured, more pins need to be configured for the control chip (for example, three pins are used to configure the pagesize, two pins are used to configure the blocksize, and four pins are used to configure the maximum ECC capability), that is, more pins need to be used, which results in high costs.

SUMMARY

Embodiments of the present invention provide a method and an apparatus for controlling memory startup, which are not limited to the number of pins of a control chip and reduce costs.

To achieve the foregoing objectives, the following technical solutions are adopted in the following embodiments:

According to a first aspect, a method for controlling memory startup is provided, where the method is applied to a control apparatus, the control apparatus includes a preset data segment, the preset data segment includes at least one sub data segment, and each sub data segment is corresponding to one configuration type; and the method includes:

reading each sub data segment in a first data segment and performing a first operation on a sub data segment corresponding to a first configuration type to obtain a second data segment, where the first data segment is a data segment obtained after a second operation is performed on a sub data segment that is in the preset data segment and is corresponding to an actual configuration type of the memory, and the first operation is an inverse operation of the second operation;

performing matching between the second data segment and the preset data segment; and starting up the memory according to the first configuration type when the second data segment matches the preset data segment.

With reference to the first aspect, in a first possible implementation manner, the reading each sub data segment in a first data segment and performing a first operation on a sub data segment corresponding to a first configuration type to obtain a second data segment includes:

reading each sub data segment in the first data segment and performing an inverse operation on the sub data segment corresponding to the first configuration type to obtain the second data segment.

With reference to the first aspect or the first possible implementation manner of the first aspect, in a second possible implementation manner, when the second data segment does not match the preset data segment, the method further includes:

reading each sub data segment in the first data segment and performing the first operation on a sub data segment corresponding to a second configuration type to obtain a third data segment;

performing matching between the third data segment and the preset data segment; and starting up the memory according to the second configuration type when the third data segment matches the preset data segment.

With reference to the first aspect or the first possible implementation manner of the first aspect, in a third possible implementation manner, when the second data segment does not match the preset data segment, the method further includes:

switching an enabled/disabled state of a randomizer of the control apparatus;

reading each sub data segment in the first data segment and performing the first operation on the sub data segment corresponding to the first configuration type to obtain a fourth data segment;

performing matching between the fourth data segment and the preset data segment; and starting up the memory according to the first configuration type when the fourth data segment matches the preset data segment.

With reference to the third possible implementation manner of the first aspect, in a fourth possible implementation manner, the switching an enabled/disabled state of a randomizer includes:

switching the enabled/disabled state of the randomizer in a case in which the first configuration type supports an enabled state and a disabled state of the randomizer.

According to a second aspect, an apparatus for controlling memory startup is provided, where the apparatus includes a preset data segment, the preset data segment includes at least one sub data segment, and each sub data segment is corresponding to one configuration type; and the apparatus includes:

a reading unit, configured to read each sub data segment in a first data segment and perform a first operation on a sub data segment corresponding to a first configuration type to obtain a second data segment, where the first data segment is a data segment obtained after a second operation is performed on a sub data segment that is in the preset data segment and is corresponding to an actual configuration type of the memory, and the first operation is an inverse operation of the second operation;

a matching unit, configured to perform matching between the second data segment and the preset data segment; and a startup unit, configured to start up the memory according to the first configuration type when the second data segment matches the preset data segment.

With reference to the second aspect, in a first possible implementation manner, the reading unit is specifically configured to read each sub data segment in the first data segment and perform an inverse operation on the sub data segment corresponding to the first configuration type to obtain the second data segment.

With reference to the second aspect or the first possible implementation manner of the second aspect, in a second possible implementation manner, when the second data segment does not match the preset data segment, the reading unit is further configured to read each sub data segment in the first data segment and perform the first operation on a sub data segment corresponding to a second configuration type to obtain a third data segment;

the matching unit is further configured to perform matching between the third data segment and the preset data segment; and the startup unit is further configured to start up the memory according to the second configuration type when the third data segment matches the preset data segment.

With reference to the second aspect or the first possible implementation manner of the second aspect, in a third possible implementation manner, when the second data segment does not match the preset data segment, the apparatus further includes a randomizer and a switching unit, where:

the switching unit is configured to switch an enabled/disabled state of the randomizer of the apparatus;

the reading unit is further configured to read each sub data segment in the first data segment and perform the first operation on the sub data segment corresponding to the first configuration type to obtain a fourth data segment;

the matching unit is further configured to perform matching between the fourth data segment and the preset data segment; and the startup unit is further configured to start up the memory according to the first configuration type when the fourth data segment matches the preset data segment.

With reference to the third possible implementation manner of the second aspect, in a fourth possible implementation manner, the switching unit is specifically configured to:

switch the enabled/disabled state of the randomizer in a case in which the first configuration type supports an enabled state and a disabled state of the randomizer.

According to the method and the apparatus for controlling memory startup provided in the embodiments of the present invention, each sub data segment included in a first data segment in the memory is separately corresponding to one configuration type, and the first data segment is a data segment obtained after a second operation is performed on a sub data segment that is in a preset data segment and is corresponding to an actual configuration type of the memory; a second data segment is obtained by reading the first data segment and performing a first operation, which is an inverse operation of the second operation, on a sub data segment corresponding to a first configuration type; and matching is performed between the second data segment and the preset data segment, and in a case in which the two data segments are matched, it is considered that the first configuration type is the actual configuration type of the memory, and the memory is started according to the first configuration type, thereby implementing automatic determining of the actual configuration type of the memory without a need of configuring pin information. As a result, the memory can be started without being limited by the number of pins, thereby reducing costs and solving a problem that costs are high because more pins need to be configured in a solution in which pin information of a control chip is manually configured so that the control chip learns the actual configuration type of the memory.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present application without creative efforts shall fall within the protection scope of the present application.

It should be noted that the character "I" in this specification generally indicates an "or" relationship between the associated objects.

Embodiment 1

Figure 1:
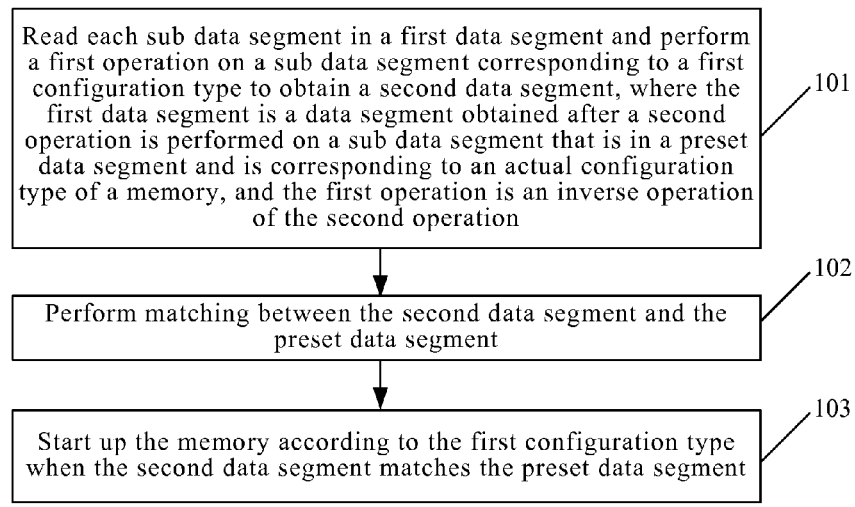
FIG. 1 is a schematic flowchart of a method for controlling memory startup according to an embodiment of the present invention.

Referring to FIG. 1, FIG. 1 shows a method for controlling memory startup according to an embodiment of the present invention, where the method is applied to a control apparatus, the control apparatus includes a preset data segment, the preset data segment includes at least one sub data segment, and each sub data segment is corresponding to one configuration type; and the method includes:

101: Read each sub data segment in a first data segment and perform a first operation on a sub data segment corresponding to a first configuration type to obtain a second data segment, where the first data segment is a data segment obtained after a second operation is performed on a sub data segment that is in the preset data segment and is corresponding to an actual configuration type of the memory, and the first operation is an inverse operation of the second operation.

The memory in this embodiment of the present invention may be a NAND Flash; and an execution body of the method provided in this embodiment of the present invention may be: a controller that controls the memory so as to implement various functions (such as a startup function, a data writing function, and a data reading function), and a physical form of the controller may be a control chip, or the like. If the memory is a NAND Flash, the execution body may be a NAND Flash Controller (NAND).

Different NAND Flashes have different configuration types, which is specifically embodied in a configuration difference of the following one or more parameters: a maximum ECC capability, a pagesize, a blocksize, and the like. This embodiment of the present invention may be applied to a scenario in which the actual configuration type of the memory is automatically determined in several configuration types formed by any one or more of the foregoing parameters, so as to control the startup of the memory according to the actual configuration type of the memory.

It should be noted that there are various configuration types formed by combinations of the foregoing parameters, and the most basic parameters and the most important parameters are the maximum ECC capability and the pagesize. Therefore, the following embodiments are all described by using an example that the actual configuration type of the memory is determined in several configuration types formed by the maximum ECC capability and the pagesize. For example, 24-bit ECC and an 8 KB pagesize form one configuration type, and 24-bit ECC and a 4 KB pagesize form another configuration type.

The preset data segment may be formed by a segment of data in a startup program for controlling the startup of the memory and ECC code generated by the segment of data. A length of the preset data segment is not limited in this embodiment of the present invention, for example, the length may be 1 KB.

The preset data segment includes at least one sub data segment, and each sub data segment is corresponding to one configuration type, for example, which may be that: the $0^{th}$ to $31^{th}$ bytes are corresponding to a configuration type formed by the 24-bit ECC and the 8 KB pagesize, the $32^{th}$ to $63^{th}$ bytes are corresponding to a configuration type formed by the 24-bit ECC and the 4 KB pagesize.

The first data segment may be the data segment obtained after the second operation is performed on the sub data segment that is in the preset data segment and is corresponding to the actual configuration type of the memory, and the first data segment may be stored in the memory in advance. The second operation is an operation used for marking the actual configuration type of the memory. A specific type of the second operation is not limited in this embodiment of the present invention. For example, the second operation is a scrambling operation performed on the actual configuration type of the memory according to a specific algorithm; and in this case, the first operation may be a descrambling operation and the like for the specific algorithm. Specifically, when the startup program is being loaded into the memory, the loading is performed after the scrambling operation is performed on the sub data segment corresponding to the actual configuration type of the memory according to the specific algorithm, and one or more other sub data segments except the sub data segment corresponding to the actual configuration type of the memory is normally loaded.

It may be known that a difference between the preset data segment and the first data segment is that the sub data segment corresponding to the actual configuration type of the memory is not marked in the preset data segment.

The step 101 may include that: after reading each sub data segment in the first data segment one by one, the control apparatus performs the first operation on the sub data segment corresponding to the first configuration type to obtain the second data segment; or, in a process of reading each sub data segment in the first data segment one by one, when the sub data segment corresponding to the first configuration type is read, the control apparatus performs the first operation on the sub data segment corresponding to the first configuration type, and obtains the second data segment after completing reading each sub data segment in the first data segment.

Optionally, the reading each sub data segment in a first data segment and performing a first operation on a sub data segment corresponding to a first configuration type to obtain a second data segment includes:

reading each sub data segment in the first data segment and performing an inverse operation on the sub data segment corresponding to the first configuration type to obtain the second data segment.

102: Perform matching between the second data segment and the preset data segment.

103: Start up the memory according to the first configuration type when the second data segment matches the preset data segment.

The second data segment matches the preset data segment, which indicates that the first configuration type is the actual configuration type of the memory. Therefore, the memory can be started according to the first configuration type.

For example, if the first configuration type is the configuration type formed by the 24-bit ECC and the 8 KB pagesize, the maximum ECC capability of the memory is set to 24 bits, the pagesize is set to 8 KB, and the memory is started according to the 24-bit ECC and the 8 KB pagesize. In addition, after controlling the memory to start, the control apparatus controls, according to the 24-bit ECC and the 8 KB pagesize, the memory to implement the data reading function, the data writing function, and the like.

In one embodiment of the present invention, when the second data segment does not match the preset data segment, the method further includes:

Step one: Read each sub data segment in the first data segment and perform the first operation on a sub data segment corresponding to a second configuration type to obtain a third data segment.

Step two: Perform matching between the third data segment and the preset data segment.

Step three: Start up the memory according to the second configuration type when the third data segment matches the preset data segment.

Exemplarily, the second configuration type is one of other configuration types corresponding to each sub data segment in the first data segment than the first configuration type. In this embodiment, when the second data segment does not match the preset data segment, it is considered that the first configuration type is not the actual configuration type of the memory. Therefore, the actual configuration type of the memory may be determined again, that is, the foregoing step one and step two are performed. If step three is performed, it indicates that the selected second configuration type is the actual configuration type of the memory.

It should be noted that when the third data segment does not match the preset data segment, the foregoing step one and step two may be performed again to obtain another matching result between the third data segment corresponding to the second configuration type and the preset data segment, until a performing condition of step three is met.

In another embodiment of the present invention, when the second data segment does not match the preset data segment, the method further includes:

Step A): Switch an enabled/disabled state of a randomizer of the control apparatus.

Step B): Read each sub data segment in the first data segment and perform the first operation on the sub data segment corresponding to the first configuration type to obtain a fourth data segment.

Step C): Perform matching between the fourth data segment and the preset data segment.

Step D): Start up the memory according to the first configuration type when the fourth data segment matches the preset data segment.

Exemplarily, the switching an enabled/disabled state of a randomizer may be changing pin enabling of the randomizer. Specifically, if the pin enabling of the randomizer is 1 in a process of performing the steps 101 and 102, change it to 0; if the pin enabling of the randomizer is 0 in the process of performing the steps 101 and 102, change it to 1.

Optionally, step A) may specifically include:

switching the enabled/disabled state of the randomizer in a case in which the first configuration type supports an enabled state and a disabled state of the randomizer.

It should be noted that in this embodiment of the present invention, when the configuration type is formed according to the combination of the maximum ECC capability and the pagesize, and the memory is started according to the first configuration type, the control apparatus may complete configuration of a blocksize in a process of reading data in the first blocksize.

According to the method for controlling memory startup provided in this embodiment of the present invention, each sub data segment included in a first data segment in the memory is separately corresponding to one configuration type, and the first data segment is a data segment obtained after a second operation is performed on a sub data segment that is in a preset data segment and is corresponding to an actual configuration type of the memory; a second data segment is obtained by reading the first data segment and performing a first operation, which is an inverse operation of the second operation, on a sub data segment corresponding to a first configuration type; and matching is performed between the second data segment and the preset data segment, and in a case in which the two data segments are matched, it is considered that the first configuration type is the actual configuration type of the memory, and the memory is started according to the first configuration type, thereby implementing automatic determining of the actual configuration type of the memory without a need of configuring pin information. As a result, the memory can be started without being limited by the number of pins, thereby reducing costs and solving a problem that costs are high because more pins need to be configured in a solution in which pin information of a control chip is manually configured so that the control chip learns the actual configuration type of the memory.

Embodiment 2

Figure 2:
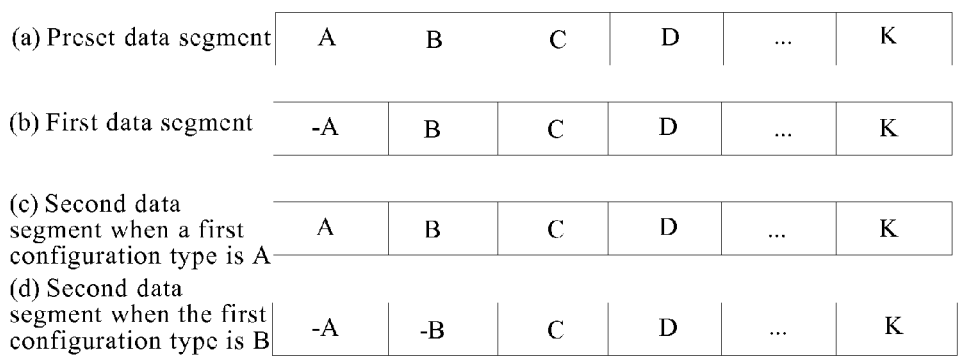
FIG. 2 is a schematic diagram of a method for controlling memory startup according to an embodiment of the present invention.

A preset data segment includes at least one sub data segment, and each sub data segment is corresponding to one configuration type. Referring to FIG. 2, (a) is a preset data segment, where the preset data segment is formed by a segment of data in a startup program of a memory and an ECC code generated by the segment of data; the preset data segment includes multiple sub data segments, and each sub data segment is separately corresponding to one configuration type, which is separately marked as A, B, C, D, . . . , and K. A is a configuration type formed by a 24-bit ECC and an 8 KB pagesize, and B is a configuration type formed by a 24-bit ECC and a 4 KB pagesize. Assuming that an actual configuration type of the memory is A, when the startup program is being loaded into the memory, an inverse operation may be performed on a sub data segment that is in the preset data segment and is corresponding to the configuration type A and then the sub data segment is loaded, and a sub data segment that is in the preset data segment and is not corresponding to the configuration type A is loaded normally, thereby generating a first data segment (as shown in (b)).

Figure 3:
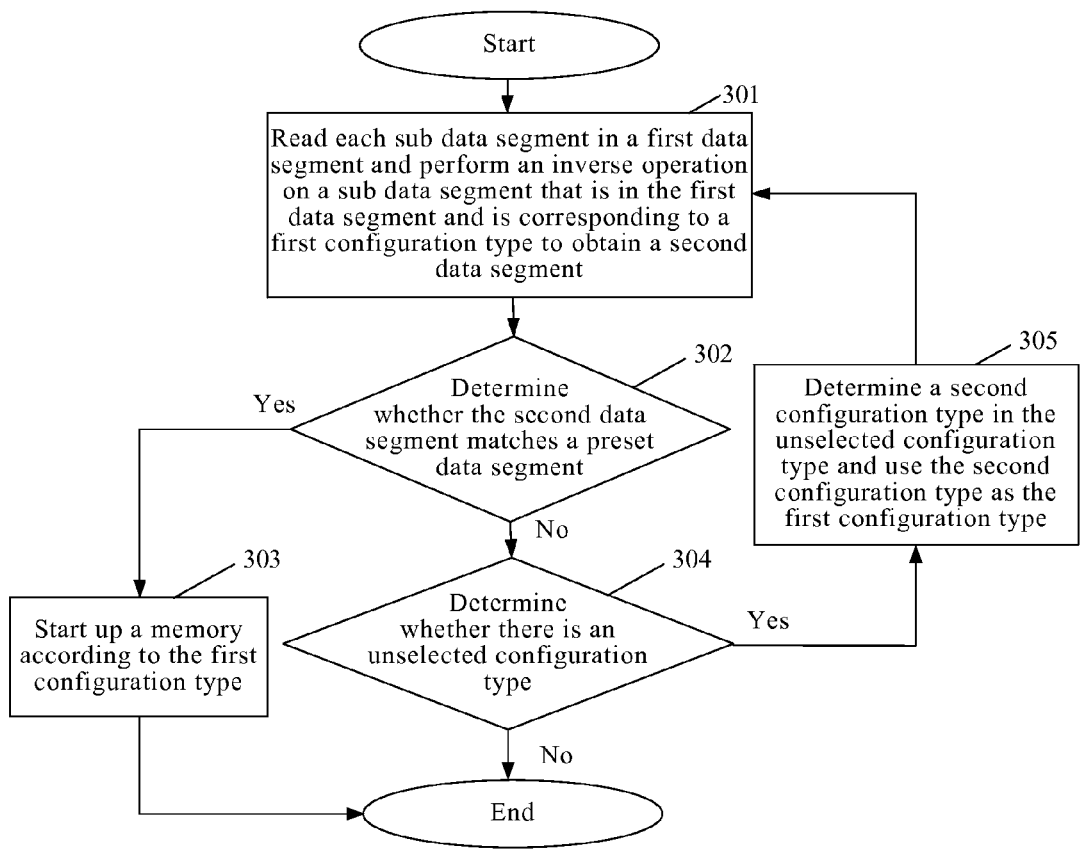
FIG. 3 is schematic flowchart of another method for controlling memory startup according to an embodiment of the present invention.

According to the preset data segment shown in (a) in FIG. 2 and the first data segment shown in (b) in FIG. 2, this embodiment of the present invention provides a method for controlling memory startup. As shown in FIG. 3, the method includes:

301: Read each sub data segment in the first data segment, perform an inverse operation on a sub data segment that is in the first data segment and is corresponding to a first configuration type, and use a first data segment obtained after the inverse operation is performed as a second data segment.

The first configuration type is specifically one of A, B, C, D, . . . , and K. In a specific implementation, the first configuration type may be a default configuration type. If a default first configuration type is A, the second data segment obtained in the step 301 is shown in (c) in FIG. 2; if the default first configuration type is B, the second data segment obtained in the step 301 is shown in (d) in FIG. 2.

302: Determine whether the second data segment matches the preset data segment.

If the second data segment matches the preset data segment, a step 303 is performed; if the second data segment does not match the preset data segment, a step 304 is performed.

When the second data segment is the same as the preset data segment, it may be considered that the second data segment matches the preset data segment, and this case indicates that the first configuration type is the actual configuration type of the memory; when the second data segment is not the same as the preset data segment, it may be considered that the second data segment does not match the preset data segment, and this case indicates that the first configuration type is not the actual configuration type of the memory. It may be known that the second data segment shown in (c) in FIG. 2 matches the preset data segment, and the second data segment shown in (d) in FIG. 2 does not match the preset data segment.

303: Start up the memory according to the first configuration type.

In this case, the second data segment is shown in (c) in FIG. 2, and the step 303 is specifically performed as follows: Set a maximum ECC capability of the memory to 24 bits, set a pagesize to 8 KB, and start up the memory according to the configuration. It should be noted that a control apparatus may complete configuration of a blocksize in a process of reading data in the first blocksize.

After the step 303, a process of searching for a matched configuration type ends.

304: Determine whether there is an unselected configuration type.

If there is no unselected configuration type, the process of searching for a matched configuration type ends; if there is an unselected configuration type, a step 305 is performed.

Exemplarily, if the default first configuration type is B, the step 304 is performed after the step 302, B is a selected configuration type, and other configuration types A, C, D, . . . , and K are unselected configuration types. When there is no unselected configuration type, it may be considered that a configuration type corresponding to each sub data segment in the first data segment has been selected, and a configuration type same as the actual configuration type of the memory is not found.

305: Determine a second configuration type in the unselected configuration type and use the second configuration type as the first configuration type. This case indicates that there is an unselected configuration type, and the process proceeds with searching for the actual configuration type of the memory in the foregoing manner.

The step 301 is performed after the step 305.

Exemplarily, as shown in FIG. 2, in the step 301, if the default first configuration type is B, the step 305 is performed. Optionally, one configuration type may be selected from the unselected configuration types A, C, D, . . . , and K as the second configuration type. A selection manner may be random selection or selection according to a preset sequence. The preset sequence may be set according to an actual project. The following provides one preset sequence: (1) a configuration type formed by a 24-bit ECC and an 8 KB pagesize; (2) a configuration type formed by a 24-bit ECC and a 4 KB pagesize; (3) a configuration type formed by a 40-bit ECC and an 8 KB pagesize; and (4) a configuration type formed by a 40-bit ECC and a 16 KB pagesize.

Exemplarily, if it is assumed that a selected second configuration type is the configuration type formed by a 40-bit ECC and an 8 KB pagesize, the second configuration type is used as the first configuration type. Specifically, the configuration type formed by the 40-bit ECC and the 8 KB pagesize is used as the first configuration type.

It should be noted that the foregoing Embodiment 1 describes the following step: Read each sub data segment in the first data segment and perform the first operation on a sub data segment corresponding to a second configuration type to obtain a third data segment. To make steps of the entire solution clear, in this embodiment, "the third data segment" described in Embodiment 1 is also referred to as the second data segment. A difference lies in that the second data segment in Embodiment 1 is the second data segment obtained after the step 301 is performed for the first time in this embodiment, and the third data segment in Embodiment 1 is the second data segment obtained after the step 301 is performed for the second time to the $K^{th}$ time in this embodiment.

According to the method for controlling memory startup provided in this embodiment of the present invention, each sub data segment included in a first data segment in the memory is separately corresponding to one configuration type, and the first data segment is a data segment obtained after a second operation is performed on a sub data segment that is in a preset data segment and is corresponding to an actual configuration type of the memory; a second data segment is obtained by reading the first data segment and performing a first operation, which is an inverse operation of the second operation, on a sub data segment corresponding to a first configuration type; and matching is performed between the second data segment and the preset data segment, and in a case in which the two data segments are matched, it is considered that the first configuration type is the actual configuration type of the memory, so that the memory is started according to the first configuration type (in a case in which the two data segments are not matched, a first configuration type is determined again in an unselected configuration type, and the foregoing step is performed again, until a second data segment that matches the preset data segment is obtained), thereby implementing automatic determining of the actual configuration type of the memory without a need of configuring pin information. As a result, the memory can be started without being limited by the number of pins, thereby reducing costs and solving a problem that costs are high because more pins need to be configured in a solution in which pin information of a control chip is manually configured so that the control chip learns the actual configuration type of the memory.

Embodiment 3

Figure 4:
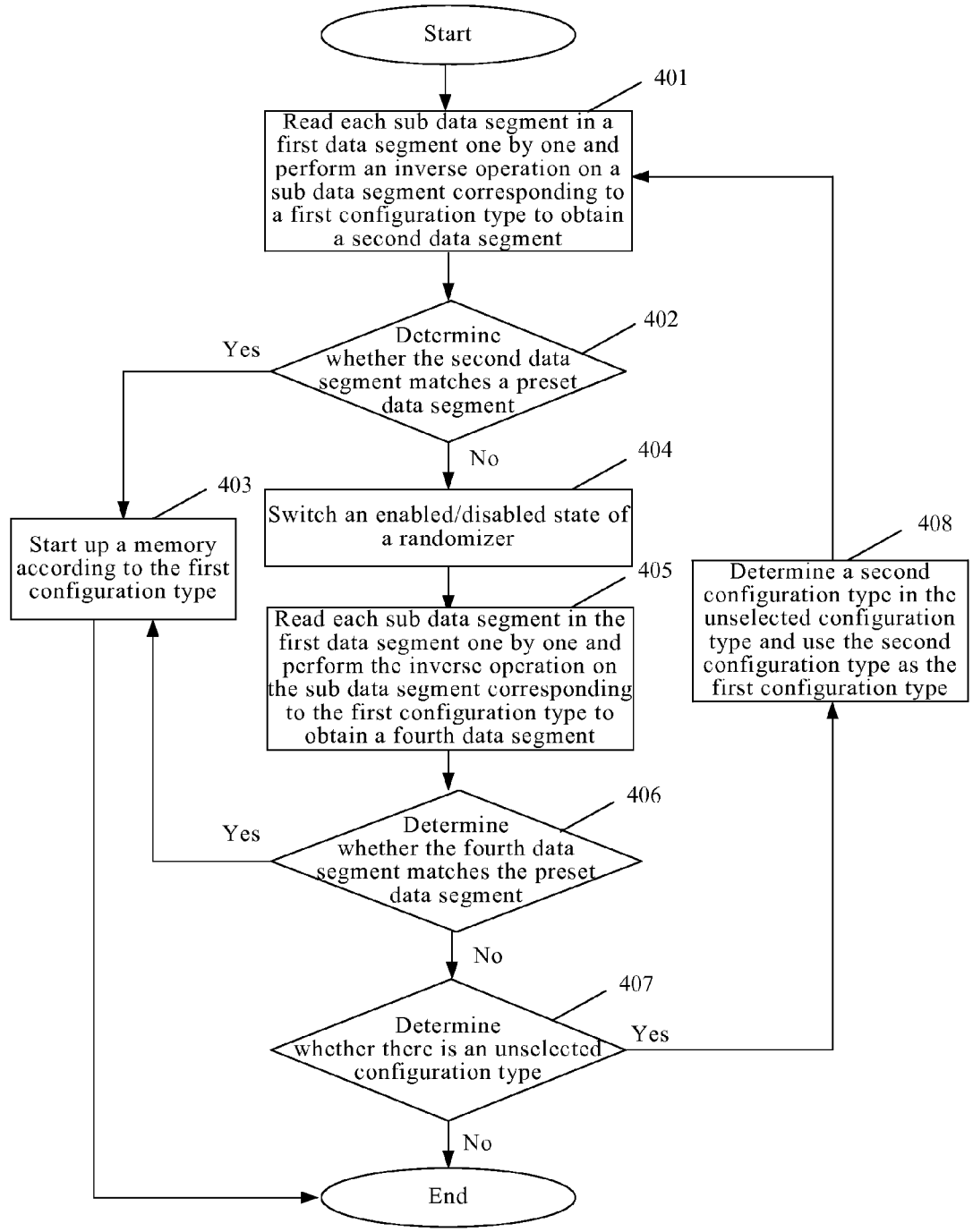
FIG. 4 is a schematic flowchart of another method for controlling memory startup according to an embodiment of the present invention.

A preset data segment includes at least one sub data segment, and each sub data segment is corresponding to one configuration type. According to the preset data segment shown in (a) in FIG. 2 and the first data segment shown in (b) in FIG. 2, this embodiment of the present invention provides another method for controlling memory startup. As shown in FIG. 4, the method includes:

401: Read each sub data segment in the first data segment, perform an inverse operation on a sub data segment that is in the first data segment and is corresponding to a first configuration type, and use a first data segment obtained after the inverse operation is performed as a second data segment.

402: Determine whether the second data segment matches the preset data segment.

If the second data segment matches the preset data segment, a step 403 is performed; if the second data segment does not match the preset data segment, a step 404 is performed.

403: Start up the memory according to the first configuration type.

For specific descriptions of the steps 401 to 403, reference may be made to the steps 301 to 303 in Embodiment 2, and details are not described any further herein.

After the step 403, a process of searching for a matched configuration type ends.

404: Switch an enabled/disabled state of a randomizer.

Exemplarily, the switching an enabled/disabled state of a randomizer may be changing pin enabling of the randomizer. Specifically, if the pin enabling of the randomizer is 1 in a process of performing the steps 401 and 402, change it to 0; if the pin enabling of the randomizer is 0 in the process of performing the steps 401 and 402, change it to 1.

405: Read each sub data segment in the first data segment, perform the inverse operation on the sub data segment corresponding to the first configuration type, and use a first data segment obtained after the inverse operation is performed as a fourth data segment.

It should be noted that, in order to keep consistency with Embodiment 1, in this embodiment, the fourth data segment is used when there are no second and third data segment.

406: Determine whether the fourth data segment matches the preset data segment.

If the fourth data segment matches the preset data segment, the step 403 is performed; if the fourth data segment does not match the preset data segment, a step 407 is performed.

407: Determine whether there is an unselected configuration type.

If there is no unselected configuration type, the process of searching for a matched configuration type ends; if there is an unselected configuration type, a step 408 is performed.

408: Determine a second configuration type in the unselected configuration type according to a preset sequence, and use the second configuration type as the first configuration type.

For a specific description of the step 408, reference may be made to the step 305 in Embodiment 2, and details are not described any further herein. The step 401 is performed after the step 408.

Figure 5A:
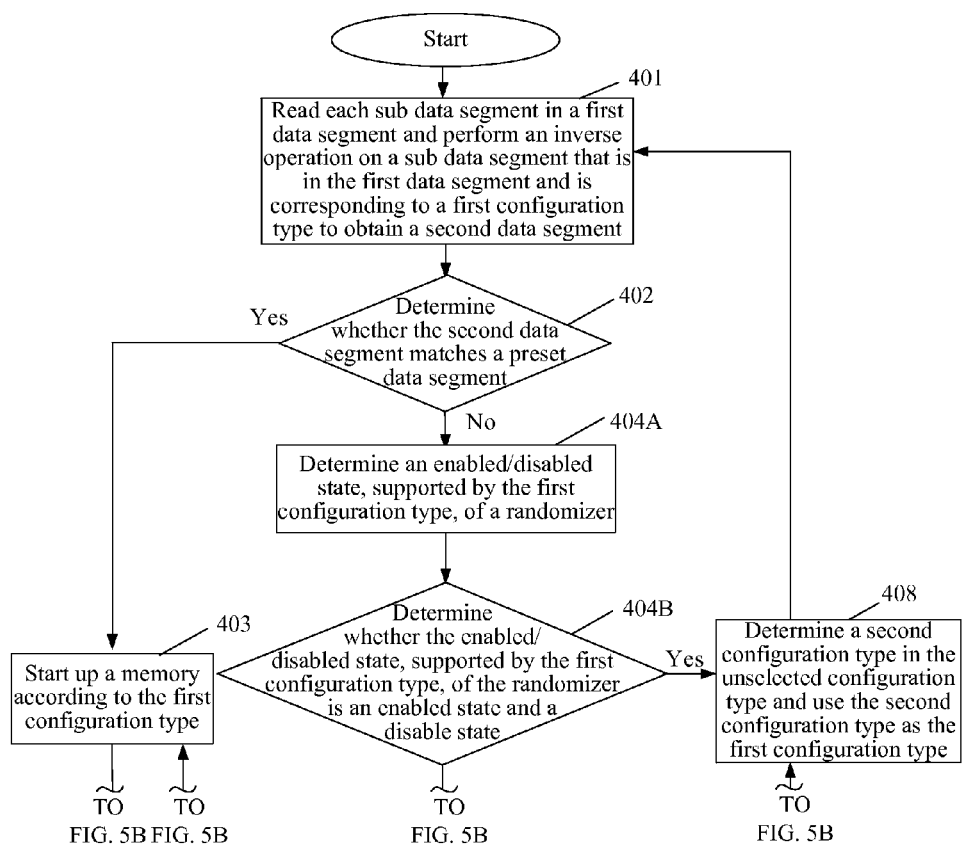
FIG. 5A and FIG. 5B are a schematic flowchart of another method for controlling memory startup according to an embodiment of the present invention.
Figure 5B:
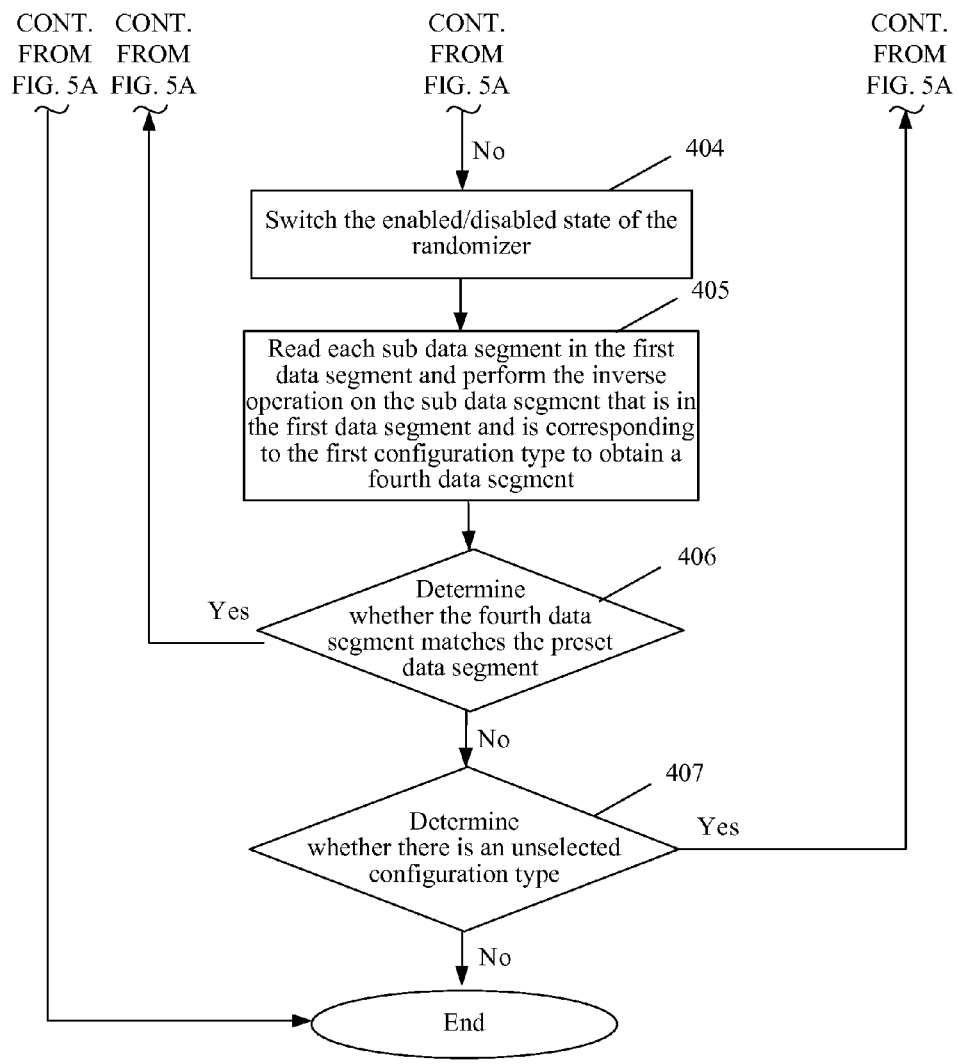

Optionally, referring to FIG. 5A and FIG. 5B, the following steps may further be included after the step 403 and before the step 404:

404A: Determine an enabled/disabled state, supported by the first configuration type, of the randomizer.

The current enabled/disabled state of the randomizer includes an enabled state and a disabled state. The enabled/disabled state, supported by the first configuration type, of the randomizer includes: the enabled state only, the disabled state only, and both the enabled state and the disabled state.

404B: Determine whether the enabled/disabled state, supported by the first configuration type, of the randomizer is the enabled state and the disabled state.

If the enabled/disabled state, supported by the first configuration type, of the randomizer is the enabled state and the disabled state, the step 404 is performed; if the enabled/disabled state, supported by the first configuration type, of the randomizer is not the enabled state and the disabled state, the step 408 is performed.

Exemplarily, when the first configuration type supports only one of the enabled state and the disabled state of the randomizer, a control apparatus sets the enabled/disabled state of the randomizer to the one of the enabled state and the disabled state supported by the first configuration type in (or before) a process of performing the step 401. For example, if the current enabled/disabled state of the randomizer is the enabled state, and the first configuration type supports only the enabled state, the control apparatus does not change the enabled/disabled state of the randomizer; if the first configuration type supports only the disabled state, the control apparatus automatically switches the randomizer from the enabled state to the disabled state.

When the first configuration type supports both the enabled state and the disabled state, the control apparatus does not change the enabled/disabled state of the randomizer in (or before) the process of performing the step 401. Therefore, in this case, it is necessary to switch the enabled/disabled state of the randomizer and then perform the steps 405 and 406, so as to exclude a case that a determining result is no in the step 402 due to incorrect setting of the enabled/disabled state of the randomizer.

Exemplarily, if it is assumed that a configuration type formed by an 8-bit ECC and a 2 KB pagesize supports only the disabled state, it may be deduced that a pin of the randomizer is in a disabled state when the first data segment is being loaded into the memory whose actual configuration type is the configuration type formed by the 8-bit ECC and the 2 KB pagesize. Therefore, the pin of the randomizer is in the disabled state in (or before) the process of performing the step 401. Further, if a matching result in the step 402 is no, it is considered that the matching result is not caused by incorrect setting of the enabled/disabled state of the randomizer, but caused by a mismatch between the first configuration type and the actual configuration type of the memory. Therefore, in this case, it is unnecessary to perform the step of switching the enabled/disabled state of the randomizer. Specific examples of other cases are not listed one by one herein again.

It should be noted that the foregoing Embodiment 1 describes the following step: Read each sub data segment in the first data segment and perform the first operation on a sub data segment corresponding to a second configuration type to obtain a third data segment. To make steps of the entire solution clear, in this embodiment, "the third data segment" described in Embodiment 1 is also referred to as the second data segment. A difference lies in that the second data segment in Embodiment 1 is the second data segment obtained after the step 401 is performed for the first time in this embodiment, and the third data segment in Embodiment 1 is the second data segment obtained after the step 401 is performed for the second time to the $K^{th}$ time in this embodiment.

According to the method for controlling memory startup provided in this embodiment of the present invention, each sub data segment included in a first data segment in the memory is separately corresponding to one configuration type, and the first data segment is a data segment obtained after a second operation is performed on a sub data segment that is in a preset data segment and is corresponding to an actual configuration type of the memory; a second data segment is obtained by reading the first data segment and performing a first operation, which is an inverse operation of the second operation, on a sub data segment corresponding to a first configuration type; and matching is performed between the second data segment and the preset data segment, and in a case in which the two data segments are matched, it is considered that the first configuration type is the actual configuration type of the memory, and the memory is started according to the first configuration type (in a case in which the two data segments are not matched, an enabled/disabled state of a randomizer is switched, and the foregoing step is performed again; and if a matching result is still that the two data segments are not matched, a first configuration type is determined again in an unselected configuration type, and the foregoing step is performed again, until a second data segment that matches the preset data segment is obtained), thereby implementing automatic determining of the actual configuration type of the memory without a need of configuring pin information. As a result, the memory can be started without being limited by the number of pins, thereby reducing costs and solving a problem that costs are high because more pins need to be configured in a solution in which pin information of a control chip is manually configured so that the control chip learns the actual configuration type of the memory.

Embodiment 4

Figure 6:
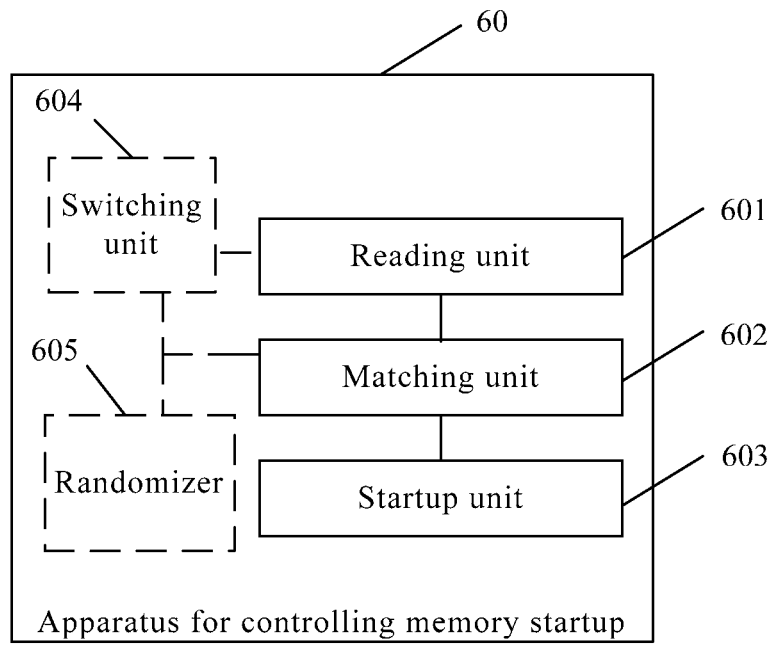
FIG. 6 is a schematic structural diagram of an apparatus for controlling memory startup according to an embodiment of the present invention.

Referring to FIG. 6, FIG. 6 is an apparatus 60 for controlling memory startup according to an embodiment of the present invention, where the apparatus 60 is configured to perform the method for controlling memory startup shown in FIG. 1. The apparatus 60 includes a preset data segment, where the preset data segment includes at least one sub data segment, and each sub data segment is corresponding to one configuration type. The apparatus 60 includes:

a reading unit 601, configured to read each sub data segment in a first data segment and perform a first operation on a sub data segment corresponding to a first configuration type to obtain a second data segment, where the first data segment is a data segment obtained after a second operation is performed on a sub data segment that is in the preset data segment and is corresponding to an actual configuration type of the memory, and the first operation is an inverse operation of the second operation;

a matching unit 602, configured to perform matching between the second data segment and the preset data segment; and a startup unit 603, configured to start up the memory according to the first configuration type when the second data segment matches the preset data segment.

Optionally, the reading unit 601 is specifically configured to read each sub data segment in the first data segment and perform an inverse operation on the sub data segment corresponding to the first configuration type to obtain the second data segment.

Optionally, when the second data segment does not match the preset data segment, the reading unit 601 is further configured to read each sub data segment in the first data segment and perform the first operation on a sub data segment corresponding to a second configuration type to obtain a third data segment;

the matching unit 602 is further configured to perform matching between the third data segment and the preset data segment; and the startup unit 603 is further configured to start up the memory according to the second configuration type when the third data segment matches the preset data segment.

Optionally, when the second data segment does not match the preset data segment, the apparatus 60 further includes a switching unit 604 and a randomizer 605.

The switching unit 604 is configured to switch an enabled/disabled state of the randomizer 605;

the reading unit 601 is further configured to read each sub data segment in the first data segment and perform the first operation on the sub data segment corresponding to the first configuration type to obtain a fourth data segment;

the matching unit 602 is further configured to perform matching between the fourth data segment and the preset data segment; and the startup unit 603 is further configured to start up the memory according to the first configuration type when the fourth data segment matches the preset data segment.

Optionally, the switching unit 604 is specifically configured to switch the enabled/disabled state of the randomizer 605 in a case in which the first configuration type supports an enabled state and a disabled state of the randomizer 605.

Optionally, the apparatus 60 may be the control apparatus described in the foregoing embodiments.

According to the apparatus for controlling memory startup provided in this embodiment of the present invention, each sub data segment included in a first data segment in the memory is separately corresponding to one configuration type, and the first data segment is a data segment obtained after a second operation is performed on a sub data segment that is in a preset data segment and is corresponding to an actual configuration type of the memory; a second data segment is obtained by reading the first data segment and performing a first operation, which is an inverse operation of the second operation, on a sub data segment corresponding to a first configuration type; and matching is performed between the second data segment and the preset data segment, and in a case in which the two data segments are matched, it is considered that the first configuration type is the actual configuration type of the memory, and the memory is started according to the first configuration type, thereby implementing automatic determining of the actual configuration type of the memory without a need of configuring pin information. As a result, the memory can be started without being limited by the number of pins, thereby reducing costs and solving a problem that costs are high because more pins need to be configured in a solution in which pin information of a control chip is manually configured so that the control chip learns the actual configuration type of the memory.

Embodiment 5

Figure 7:
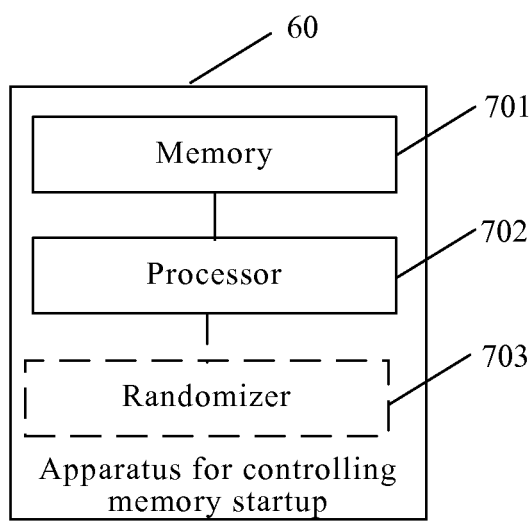
FIG. 7 is a schematic structural diagram of another apparatus for controlling memory startup according to an embodiment of the present invention.

Referring to FIG. 7, FIG. 7 is an apparatus 60 for controlling memory startup according to an embodiment of the present invention, where the apparatus 60 is configured to perform the method for controlling memory startup shown in FIG. 1. The apparatus 60 includes a preset data segment, where the preset data segment includes at least one sub data segment, and each sub data segment is corresponding to one configuration type. The apparatus 60 includes a memory 701 and a processor 702.

The memory 701 is configured to store a group of code, where the code is used to control the processor 702 to perform the following operations:

Read each sub data segment in a first data segment and perform a first operation on a sub data segment corresponding to a first configuration type to obtain a second data segment, where the first data segment is a data segment obtained after a second operation is performed on a sub data segment that is in the preset data segment and is corresponding to an actual configuration type of the memory, and the first operation is an inverse operation of the second operation;

perform matching between the second data segment and the preset data segment; and start up the memory according to the first configuration type when the second data segment matches the preset data segment.

Optionally, the processor 702 is specifically configured to read each sub data segment in the first data segment and perform an inverse operation on the sub data segment corresponding to the first configuration type to obtain the second data segment.

Optionally, when the second data segment does not match the preset data segment, the processor 702 is further configured to perform the following operations:

Read each sub data segment in the first data segment and perform the first operation on a sub data segment corresponding to a second configuration type to obtain a third data segment;

perform matching between the third data segment and the preset data segment; and start up the memory according to the second configuration type when the third data segment matches the preset data segment.

Optionally, the apparatus 60 further includes a randomizer 703. When the second data segment does not match the preset data segment, the processor 702 is further configured to perform the following operations:

Switch an enabled/disabled state of the randomizer 703;

read each sub data segment in the first data segment and perform the first operation on the sub data segment corresponding to the first configuration type to obtain a fourth data segment;

perform matching between the fourth data segment and the preset data segment; and start up the memory according to the first configuration type when the fourth data segment matches the preset data segment.

Optionally, the processor 702 is specifically configured to switch the enabled/disabled state of the randomizer 703 in a case in which the first configuration type supports an enabled state and a disabled state of the randomizer 703.

Optionally, the apparatus 60 may be the control apparatus described in the foregoing embodiments.

According to the apparatus for controlling memory startup provided in this embodiment of the present invention, each sub data segment included in a first data segment in the memory is separately corresponding to one configuration type, and the first data segment is a data segment obtained after a second operation is performed on a sub data segment that is in a preset data segment and is corresponding to an actual configuration type of the memory; a second data segment is obtained by reading the first data segment and performing a first operation, which is an inverse operation of the second operation, on a sub data segment corresponding to a first configuration type; and matching is performed between the second data segment and the preset data segment, and in a case in which the two data segments are matched, it is considered that the first configuration type is the actual configuration type of the memory, and the memory is started according to the first configuration type, thereby implementing automatic determining of the actual configuration type of the memory without a need of configuring pin information. As a result, the memory can be started without being limited by the number of pins, thereby reducing costs and solving a problem that costs are high because more pins need to be configured in a solution in which pin information of a control chip is manually configured so that the control chip learns the actual configuration type of the memory.

It may be clearly understood by persons of skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. Furthermore, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented by hardware in addition to a software functional unit, or by hardware only.

The integrated unit implemented in the form of software functional unit may be stored in a computer readable storage medium. The software functional unit is stored in a storage medium, and includes several instructions for instructing a computer device (which may be a personal computer, a server, a network device, or the like) to perform all or a part of the steps of the methods described in the embodiments of the present invention. The foregoing storage medium includes any medium that can store program code, such as a USB flash drive, a removable hard disk, a Read-Only Memory (ROM), a Random Access Memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for controlling memory startup, wherein the method is applied to a control apparatus, the control apparatus comprises a preset data segment, the preset data segment comprises at least one sub data segment, and each sub data segment of the preset data segment corresponds to one configuration type; and the method comprises:
   reading each sub data segment in a first data segment and performing a first operation on a sub data segment of the first data segment which corresponds to a first configuration type to obtain a second data segment, wherein the first data segment comprises a first sub data segment and a second sub data segment, the first sub data segment is obtained after a second operation is performed on a sub data segment of the preset data segment and corresponds to an actual configuration type of the memory, the second sub data segment is from the preset data segment and does not correspond to the actual configuration type of the memory, and the first operation is an inverse operation of the second operation;
   determining whether the second data segment and the preset data segment are equal; and
   starting up the memory according to the first configuration type when the second data segment is equal to the preset data segment.

2. The method according to claim 1, wherein:
   the reading each sub data segment in the first data segment and performing the first operation on the sub data segment corresponding to the first configuration type to obtain the second data segment comprises:
   reading each sub data segment in the first data segment and performing an inverse operation on the sub data segment corresponding to the first configuration type to obtain the second data segment.

3. The method according to claim 1, wherein when the second data segment does not match the preset data segment, the method further comprises:
   reading each sub data segment in the first data segment and performing the first operation on a sub data segment corresponding to a second configuration type to obtain a third data segment;
   performing matching between the third data segment and the preset data segment; and
   starting up the memory according to the second configuration type when the third data segment matches the preset data segment.

4. The method according to claim 1, wherein when the second data segment does not match the preset data segment, the method further comprises:
   switching an enabled/disabled state of a randomizer of the control apparatus;
   reading each sub data segment in the first data segment and performing the first operation on the sub data segment corresponding to the first configuration type to obtain a fourth data segment;
   performing matching between the fourth data segment and the preset data segment; and
   starting up the memory according to the first configuration type when the fourth data segment matches the preset data segment.

5. The method according to claim 4, wherein the switching the enabled/disabled state of the randomizer comprises:

switching the enabled/disabled state of the randomizer if the first configuration type supports an enabled state and a disabled state of the randomizer.

6. An apparatus for controlling memory startup, wherein the apparatus comprises a preset data segment, the preset data segment comprises at least one sub data segment, and each sub data segment of the preset data segment corresponds to one configuration type; and the apparatus comprises:

a reading unit, configured to read each sub data segment in a first data segment and perform a first operation on a sub data segment of the first data segment which corresponds to a first configuration type to obtain a second data segment, wherein the first data segment comprises a first sub data segment and a second sub data segment, the first sub data segment is obtained after a second operation is performed on a sub data segment of the preset data segment and corresponds to an actual configuration type of the memory, the second sub data segment is from the preset data segment and does not correspond to the actual configuration type of the memory, and the first operation is an inverse operation of the second operation;

a matching unit, configured to determine whether the second data segment and the reset data segment are equal; and a startup unit, configured to start up the memory according to the first configuration type when the second data segment is equal to the preset data segment.

7. The apparatus according to claim 6, wherein:
the reading unit is configured to read each sub data segment in the first data segment and perform an inverse operation on the sub data segment corresponding to the first configuration type to obtain the second data segment.

8. The apparatus according to claim 6, wherein when the second data segment does not match the preset data segment,
the reading unit is further configured to read each sub data segment in the first data segment and perform the first operation on a sub data segment corresponding to a second configuration type to obtain a third data segment;
the matching unit is further configured to perform matching between the third data segment and the preset data segment; and
the startup unit is further configured to start up the memory according to the second configuration type when the third data segment matches the preset data segment.

9. The apparatus according to claim 6, wherein when the second data segment does not match the preset data segment, the apparatus further comprises a randomizer and a switching unit, wherein:
the switching unit is configured to switch an enabled/disabled state of the randomizer of the apparatus;
the reading unit is further configured to read each sub data segment in the first data segment and perform the first operation on the sub data segment corresponding to the first configuration type to obtain a fourth data segment;
the matching unit is further configured to perform matching between the fourth data segment and the preset data segment; and
the startup unit is further configured to start up the memory according to the first configuration type when the fourth data segment matches the preset data segment.

10. The apparatus according to claim 9, wherein the switching unit is configured to:
switch the enabled/disabled state of the randomizer if the first configuration type supports an enabled state and a disabled state of the randomizer.

* * * * *